UNITED STATES PATENT OFFICE.

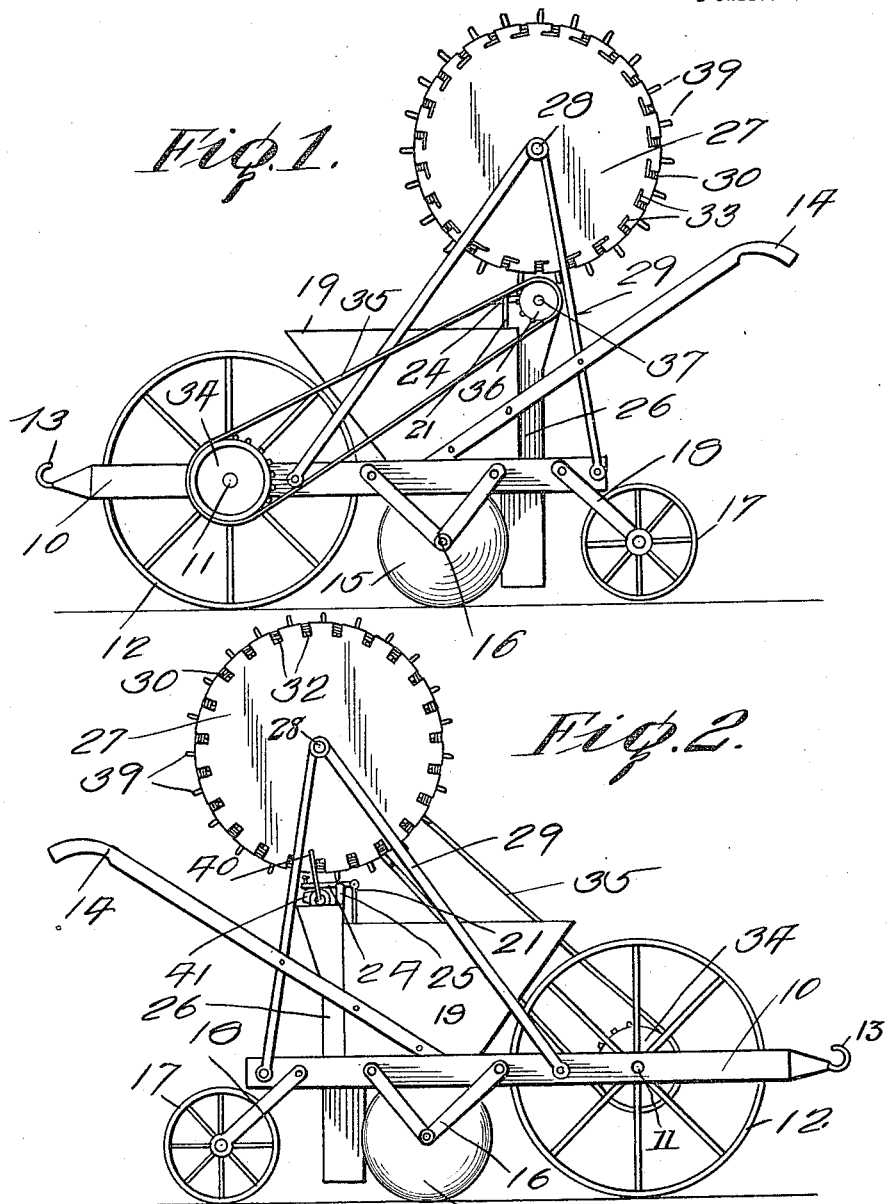

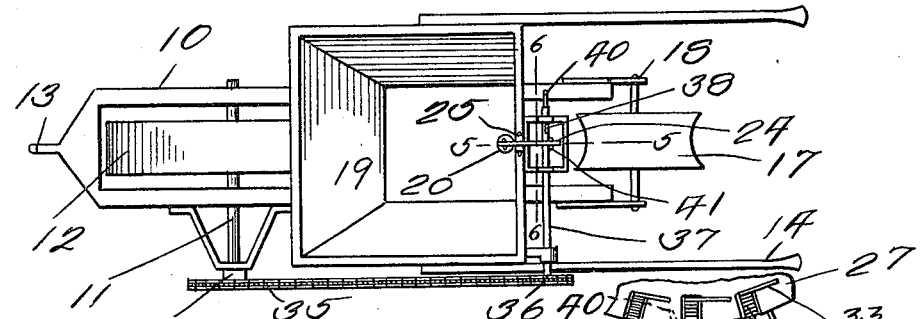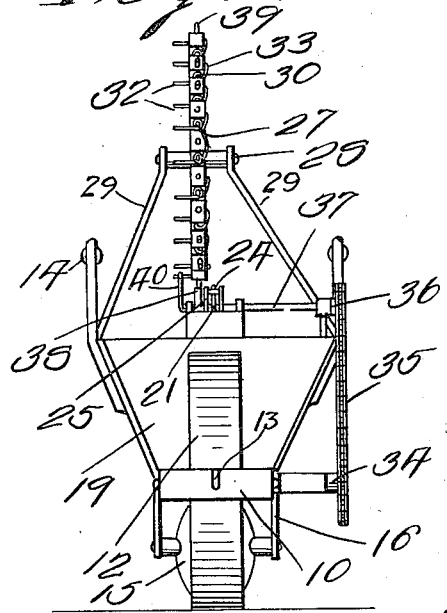

SOLOMON L. BRYANT, OF MOUNT AIRY, NORTH CAROLINA.

PLANT-SETTING MACHINE.

1,154,173.   Specification of Letters Patent.   Patented Sept. 21, 1915.

Application filed October 5, 1914. Serial No. 865,102.

*To all whom it may concern:*

Be it known that I, SOLOMON L. BRYANT, a citizen of the United States, residing at Mount Airy, in the county of Surry, State of North Carolina, have invented certain new and useful Improvements in Plant-Setting Machines; and I do hereby declare the following to be a full, clear, and exact description of the invention, such as will enable others skilled in the art to which it appertains to make and use the same.

This invention relates to planting devices, particularly to a machine for replanting in rows plants thinned out from rows or grown in starting beds and has for its object the provision of a simple and novel device whereby plants may be automatically deposited and pressed into the ground at regular intervals, water being automatically supplied to each plant as it reaches the ground.

An important object is the provision of a device of this character provided with novel means for holding the plants before the device is actuated to drop them upon the ground.

A further object is the provision of a planter of this character provided with novel and particular means for imparting a step by step movement to the plant holding reel and for actuating the individual plant retaining devices to release the plants so that they may be deposited through suitable guide means onto the ground.

An additional object is the provision of a planter of this character which will be simple and inexpensive in manufacture, easy in operation, efficient and durable in service and a general improvement of the art.

With these and other objects and advantages in view, the invention consists in the novel construction and arrangement of parts as will be hereinafter more fully described and claimed, and illustrated in the accompanying drawing, in which—

Figure 1 is a side elevation of the planter, Fig. 2 is an elevation of the opposite side, Fig. 3 is a top plan view, omitting the reel, Fig. 4 is a front elevation, Fig. 5 is a vertical longitudinal sectional view on the line 5—5 of Fig. 3, Fig. 6 is a vertical sectional view on the line 6—6 of Fig. 3, Fig. 7 is a fragmentary side elevation of the reel showing plants held thereon, and Fig. 8 is a fragmentary plan view of the reel.

Referring more particularly to the drawing, the numeral 10 designates the main bars constituting the supporting frame of the planter. The bars 10 are supported upon a transverse shaft 11 carrying wheels 12 and are provided with draft attaching means 13. Handles 14 are connected with the bars 10 and extend upwardly and rearwardly in an inclined direction. Secured upon the frame rearwardly of the wheels 12 is a disk or furrow opener 15 which is supported by braces 16. Disposed rearwardly of and in alinement with the disk 15 is a presser wheel 17 journaled upon arms 18 connected with the frame.

Disposed upon the frame above the disk 15 is a tank 19 adapted to contain water and provided adjacent the rear edge of its bottom portion with an outlet opening having a valve 20 disposed therein and secured upon a rod 21 extending upwardly through and beyond the top of the tank 19. The valve 20 is normally held in a position closing the hole by a coil spring 22 which encircles the rod 21, and is disposed between a pin 23′ arranged transversely of the latter, and a projection 23 extending from the rear wall of the tank slidably receiving the rod. At its upper end, the rod 21 is pivotally connected with a lever 24 pivoted intermediate its ends upon a support 25 secured to the rear wall of a tank. When the rear end of the lever 24 is moved downwardly, the valve 20 will be opened and water will flow out through the opening. The purpose of this will be made apparent hereinafter.

Secured upon the rear side of the tank 19 at its central portion is a chute 26 terminating at its lower end a short distance above the ground. The lower portion of the chute is wider than the upper portion so as to be disposed sufficiently far forwardly of the rear edge of the bottom of the tank that water passing out through the bottom of the tank will be discharged into the chute.

The means for holding the plants to be planted comprise a circular drum 27 journaled as shown through boxings 28 secured upon the upper end of brace rods 29 secured upon the main frame. The individual plant holding members are carried by the drum 27 and comprise lengths of wire wound into spiral form as shown at 30 and having arms 31 and 32 extending from the ends of the coil. Each arm 31 is provided upon its end with a lateral portion 33 forming a hook pressing a plant disposed therein against the side of the drum. The natural resilience of the spring wire from which these members are formed will operate to maintain this clamping relation. The arms 32 extend beyond the other side of the drum and are inclined outwardly from the periphery thereof so that movement of the arms 32 against the periphery of the drum will move the arms 31 outwardly and disengage the plants held by the hooked ends 33.

The mechanism for operating these various parts comprises a sprocket 34 secured upon the shaft 11 carrying the ground wheels, and having a chain 35 trained thereover and over a sprocket 36 secured upon a shaft 37 journaled upon the rear brace rods 29. As the device is drawn over the ground, the shaft 37 will consequently be rotated. The shaft 37 carries a laterally extending finger 38 adapted to successively engage a plurality of tappets 39 extending from the periphery of the drum 27. During every rotation of the shaft 37, the drum 27 will be moved one step which will be the distance between two successive tappets. The number of tappets corresponds with the number of plant holding clamps so that every step in the movement of the drum 27 will bring a plant in position above the top of the chute 26. As each plant reaches this position, the clamp holding it is released by virtue of the engagement of a laterally extending finger 40 upon the end of the shaft 37 with the arm 32 of the clamp. This will release the hooked end 33 of the clamp from the plant, consequently allowing the plant to drop into and through the chute 26 onto the ground. At the same time, the lever 24 will be engaged by a crank or laterally extending finger 41 adjacent the other end of the shaft 37, whereupon the rod 21 will be moved downwardly carrying the valve 20 off its seat and allowing water to flow through the hole in the tank into the chute. The plants upon dropping will fall into the furrow made by the disk 15, after which they will be pressed into place by the follower or presser wheel 17. It will be observed that this operation will be repeated at each revolution of the shaft 37. It will be obvious that the distance between the successive plants planted is dependent upon the relative sizes of the sprockets 34 and 36.

From the foregoing description and a study of the drawing it will be apparent that I have thus provided a simple, novel and efficient device whereby plants may be properly planted with rapidity and ease at regular spaced intervals and simultaneously watered.

It will be readily understood that I reserve the right to make various changes in the form, construction and arrangement of parts without departing from the spirit of the invention or limiting the scope of the subjoined claims.

Having thus described my invention, I claim:

1. A device of the character described comprising a frame, ground wheels thereon, a furrow opener supported on said frame, a presser wheel on said frame, a water supply tank on said frame above said furrow opener, a valve in the bottom of said tank a chute disposed adjacent said tank, a shaft adjacent said chute and driven by said ground wheels, a rotary drum, plant holding clamps on said drum, and means actuated by the rotation of said shaft for releasing said clamps successively and simultaneously opening said valve, said plants and the water passing through said chute onto the ground.

2. A device of the character described comprising a frame having ground wheels journaled thereon, a revoluble drum, a plurality of clamps on said drum adapted to retain plants, a rotary shaft driven by said ground wheels, means carried by said shaft for rotating said drum step by step, and a laterally extending finger on said shaft engaging said clamps successively for releasing the plants.

3. A device of the character described comprising a frame supported upon ground wheels, a furrow opener and a presser wheel carried by said frame, a tank supported on said frame and provided at its bottom with an opening, a chute disposed adjacent said tank and having said opening discharging thereinto, a vertically movable rod in said tank and provided with a valve seating within said opening, a pivoted lever connected with said rod, a revoluble shaft driven by said ground wheels, a finger on said shaft engaging said lever during every revolution for opening said valve, a rotary drum above said chute, means on said drum for carrying plants, means operated by said shaft for moving said drum step by step to bring the plants carried thereby successively over said chute, and means actuated by said shaft for releasing said plants.

In testimony whereof, I affix my signature, in the presence of two witnesses.

SOLOMON L. BRYANT.

Witnesses:
JOHN W. GARDNER,
J. M. BRINKLEY.